Patented Aug. 24, 1948

2,447,481

UNITED STATES PATENT OFFICE 2,447,481

METHOD OF SYNTHESIZING ALIPHATIC MERCAPTANS AND SULFIDES

Richmond T. Bell and Carlisle M. Thacker, Highland Park, Ill., assignors to The Pure Oil Company, Chicago, Ill., a corporation of Ohio No Drawing. Application December 31, 1943, Serial No. 516,548

21 Claims. (Cl. 260—609)

This invention relates to the preparation of mercaptans and alkyl sulfides by reaction of acylic unsaturated hydrocarbons such as olefines with hydrogen sulfide.

One of the objects of the invention is to provide a method of preparing mercaptans.

Another object of the invention is to provide a method for preparing alkyl sulfides.

Further objects of the invention will be revealed by the following description.

We have discovered that if hydrogen sulfide and unsaturated acyclic hydrocarbons are contacted with commercial anhydrous aluminum chloride in the presence of anhydrous hydrogen chloride, the hydrocarbons react readily with the hydrogen sulfide to form mercaptans and sulfides. The relative proportions of mercaptans and sulfides which form are dependent upon the temperature at which the reaction is carried out, the length of time of contact and the relative proportions of hydrogen sulfide and hydrocarbons present in the mixture.

Reaction of hydrogen sulfide with olefines may be carried out at temperatures from approximately −35° C., to approximately 150° C. The reaction proceeds readily within the range of atmospheric temperature, but for production of mercaptans satisfactory results are achieved at temperatures in the vicinity of 0° C. Reaction may be carried out at pressures ranging from approximately atmospheric to 500 pounds per square inch or more. We have found that pressures of approximately 100 to 200 pounds per square inch are very satisfactory.

Our invention is applicable to the preparation of mercaptans and alkyl sulfides from olefins such as ethylene, propylene, butenes, pentenes, octenes and dodecenes. Mercaptans prepared in accordance with our invention are useful in the synthesis of alkylated benzene and in the preparation of synthetic rubber.

Our invention may be carried out batch-wise or in a more continuous manner. In a batch method of preparation, the desired quantities of reactants and catalyst may be charged to a pressure vessel equipped with means for thorough agitation, and maintained at a desired temperature and pressure for a given period of time. The contents, including all cataylst complexes, are then discharged and hydrolysed. Organic products separated from the hydrolysis are treated with weak sodium carbonate solution to remove hydrogen sulfide and hydrogen chloride.

There are several methods for operating in a more continuous manner. For example, liquid olefin and catalyst may be charged to a vertical reactor equipped with means for efficient agitation, and maintained at a desired temperature and pressure for a given period of time. Hydrogen sulfide and hydrogen chloride are passed through the reaction mixture and any excess is recycled. After the desired contact time has elapsed, agitation is stopped and sufficient time is allowed for the reaction mixture to separate into two layers, an upper product layer and a lower catalyst complex layer. The upper layer is drawn off through an exit line in the side of the reactor above the interface level, and is hydrolysed by acidified water. The organic products separated from the hydrolysis are treated with weak sodium carbonate solution to remove hydrogen sulfide and hydrogen chloride. Another charge of olefin is then introduced and agitation, together with introduction of hydrogen sulfide and hydrogen chloride, resumed. This procedure can be repeated until catalytic activity has reached a negligible value, and at this time the complex layer as well as the last upper layer product is withdrawn and hydrolysed either separately or together with the upper layer. Mercaptans and sulfides may be separated from unreacted olefins by conventional methods of distillation and/or extraction, and the unreacted olefins may be used for part of the charge stock.

Another method of more continuous operation achieves agitation by circulation of the liquid reaction mixture as long as the complex phase remains sufficiently fluid. Aluminum chloride may be charged to a loosely packed vertical reactor containing a screen at the bottom to retain aluminum chloride until liquid complex is formed. Liquid olefin may be charged in the top of the tower and hydrogen sulfide and hydrogen chloride in the bottom of the tower. Liquid is circulated from the bottom of the tower to the top and hydrogen sulfide is added only in sufficient amount to maintain the pressure. Products may be continuously withdrawn from the circulating stream, and the heavier catalyst complex may be separated from the less dense products by mechanical means such as centrifuging. Liquid complex is returned to the system and liquid products are continuously hydrolysed by counter current treatment with water, preferably acidified. Organic products separated after hydrolysis may be continuously washed free of hydrogen sulfide and hydrogen chloride by counter-current treatment with weak sodium carbonate solution followed by water washing. Mercaptans and sulfides may be separated from the finished product by distillation and/or extraction methods, and unreacted olefins from the separation may be returned to the process as part of the charge stock.

In carrying out our invention hydrogen sulfide and olefin may be mixed in molal proportions ranging from approximately 1 part of hydrogen sulfide to 10 parts of olefine, to 10 parts of hydrogen sulfide to 1 part of olefine, although it will be understood that we are not limited to these proportions. Good results have been obtained using proportions of one mole of hydrogen sulfide to 2 moles of olefine to 2 moles of hydrogen sulfide to 1 mole of olefine.

In the preparation of mercaptans from low boiling olefins such as ethylene, reaction proceeds more rapidly at temperatures of 0° C. and below, with low formation of sulfides. With increase of temperature there is a tendency for alkyl sulfides to form at the expense of mercaptans, but such tendency can be reduced by shortening contact times. At low temperatures such as 0° C. and a comparatively short contact time of 17 hours, an increase in the ratio of hydrogen sulfide to olefin favors mercaptan formation, but at 25° C. and a long contact time of 72 hours there is a marked tendency toward sulfide formation when the hydrogen sulfide to olefin ratio is increased. In the case of ethylene, high yields of mercaptan can be obtained at temperatures of approximately 0° C. with a hydrogen sulfide to ethylene ratio of 2 to 1 moles.

Although mercaptan yields of 30% theoretical can be obtained with ease from ethylene and hydrogen sulfide at temperatures of approximately 0° C., much higher yields can be obtained with higher boiling olefines. For example, with crude triisobutylene, yields in the neighborhood of 75% of theoretical are obtainable at approximately 20 to 30° C.

Although the higher boiling olefines react with greater ease than the lower boiling olefines and therefore lower temperatures may be used, we prefer to use temperatures of approximately 20 to 30° C., that is, ordinary room temperatures, in the synthesis of mercaptans from olefines having 8 or more carbon atoms to the molecule, since large yields of mercaptans with only small amounts of alkyl sulfides are produced.

The ratio of catalyst to reactants may vary widely. The larger the amount of catalyst present the greater the quantity of products formed and hence the larger the conversion. Aluminum chloride may be mixed with the reactants in amounts ranging from 0.05 to 1.5 moles per mole of olefine in a batch operation, or per mole of olefine initially present in the reaction zone in more continuous operation.

In either batch or more continuous operation contact times may vary over as wide a range as several minutes to several days although in general operation in a continuous manner is more satisfactory with short contact times, determined by the relation of charge rate, temperature, and the extent of conversion.

The amount of hydrogen chloride gas present in the admixture may vary from 0.01 mole to 1.0 mole per mole of aluminum chloride.

In order to demonstrate the efficacy of simultaneous use of aluminum chloride and hydrogen chloride in the formation of mercaptans and sulfides from hydrogen sulfide and olefines a series of runs was made using hydrogen sulfide and ethylene as the reactants. A run was made in which no catalyst was used. Other runs were made in which aluminum chloride alone was used as the catalyst. One run was made using hydrogen chloride as the catalyst, and two runs were made using aluminum chloride together with hydrogen chloride as catalyst. The runs were made in a bomb having a capacity of 850 c. c. and were carried out at pressures ranging from 100 to 200 pounds per square inch. In making the run the bomb was swept out with nitrogen gas prior to charging the catalyst and the reactants. After the catalyst and reactants were charged to the bomb in desired proportions, the bomb was allowed to stand for a desired period of time after which the vapors in the bomb were very slowly released through a washing and absorption train. The data on the runs are listed in the following table. Although the temperature of the runs is shown as 25° C. the runs were all made at atmospheric temperature and the temperature varied from 21 to 27° during the runs.

In the runs made prior to run E-32, the reaction gases discharged from the bomb were allowed to pass in a fine dispersion through a long column (600 c. c.) of water topped with 100 c. c. of decalin in order to absorb hydrogen sulfide, mercaptans and alkyl sulfides from the gas stream. The reaction bomb was water-washed and extracted with decalin. Starting with run E-32, a column of aqueous sodium carbonate solution topped with solvent naphtha (Stoddard solvent) was used instead of the water topped with decalin, since it was found that the sodium carbonate solution would substantially completely remove the hydrogen sulfide and the Stoddard solvent would absorb the mercaptans and sulfides. Mercaptan sulfur was determined in the solution by the silver nitrate method and sulfide sulfur was determined by the bromine-water method.

| Charge $H_2S$ | Moles $C_2H_4$ | Catalyst Kind | Catalyst Moles | Contact Time/Hrs. | Temp., °C. | Yield, Per Cent of Theoretical Sulfur as Mercaptans | Yield, Per Cent of Theoretical Sulfur as Sulfides | Run No. |
|---|---|---|---|---|---|---|---|---|
| 0.09 | 0.09 | None | 0.00 | 1,296 | 25 | 0.2 | | E-12 |
| 0.10 | 0.21 | $AlCl_3$ | 0.10 | 17 | 0 | 11.0 | 3.6 | E-98 |
| 0.17 | 0.17 | ---do--- | 0.10 | 18 | 0 | 22.3 | 5.1 | E-69 |
| 0.24 | 0.12 | ---do--- | 0.10 | 17 | 0 | 31.1 | 2.1 | E-87 |
| 0.11 | 0.22 | ---do--- | 0.10 | 74 | 25 | 13.8 | 7.9 | E-96 |
| 0.10 | 0.10 | ---do--- | 0.10 | 72 | 25 | 10.2 | 12.8 | E-8 |
| 0.24 | 0.12 | ---do--- | 0.10 | 69 | 25 | 5.8 | 20.1 | E-62 |
| 0.18 | 0.18 | ---do--- | 0.10 | 72 | 25 | 7.7 | 6.0 | E-32 |
| 0.17 | 0.17 | ---do--- | 0.10 | 4 | 25 | 11.4 | 0.2 | E-72 |
| 0.24 | 0.11 | ---do--- | 0.10 | 5 | 25 | 10.0 | 1.1 | E-78 |
| 0.10 | 0.10 | HCl | 0.10 | 24 | 25 | 0.0 | 0.0 | E-112 |
| 0.10 | 0.10 | $AlCl_3$ | 0.10 | 24 | 25 | 11.2 | 3.6 | E-111 |
| 0.10 | 0.10 | {$AlCl_3$ / HCl} | {0.10 / 0.10} | 24 | 25 | 17.5 | 8.3 | E-113 |
| 0.12 | 0.12 | {$AlCl_3$ / HCL} | {0.10 / 0.10} | 21 | 25 | 18.0 | 4.1 | E-84 |

It will be observed from the table that hydrogen chloride gas alone does not catalyze the reaction. Aluminum chloride alone on the other hand is a good catalyst. The effectiveness of aluminum chloride to produce either mercaptan or sulfide is dependent on the time of contact, temperature and the relative proportions of hydrogen sulfide and ethylene charged to the bomb. With a contact time of approximately 24 hours or less aluminum chloride caused the formation predominantly of mercaptans with a small amount of sulfide. This tendency to form the mercaptan in preference to the sulfide was enhanced by increasing the ratio of hydrogen sulfide to ethylene as shown by runs E-98, E-69 and E-87. On the other hand long contact times promoted the formation of sulfides as shown by runs E-8 and E-32. Contrary to the effect of high ratio of hydrogen sulfide to ethylene at short contact times and low temperatures, the effect was just the reverse with long contact times and higher temperatures as shown by runs E-96, E-8 and E-62.

The marked effect of having hydrogen chloride gas present in the reaction mixture is shown by runs E-84 and run 113. The increase in the mercaptan yield is very marked.

It will be seen, therefore, that by catalyzing the reaction of olefines and hydrogen sulfide with aluminum chloride in the presence of hydrogen chloride a marked increase in the yields of mercaptans and sulfides, but principally mercaptans, over those which are obtainable in the presence of aluminum chloride alone is effected.

It is claimed:

1. The method of synthesizing aliphatic mercaptans and sulfides from hydrogen sulfide and olefinic hydrocarbons which comprises chemically reacting a mixture of hydrogen sulfide and olefinic hydrocarbons in contact with anhydrous aluminum chloride in the presence of anhydrous hydrogen chloride the molal ratio of olefinic hydrocarbons to hydrogen sulfide being within the limits of 10:1 to 1:10.

2. The process in accordance with claim 1 in which the hydrogen sulfide and olefinic hydrocarbons are reacted at a temperature of approximately —35° C. to 150° C.

3. The method in accordance with claim 1 in which the olefinic hydrocarbon is ethylene.

4. The method in accordance with claim 1 in which the olefinic hydrocarbon is propylene.

5. The method in accordance with claim 1 in which the olefinic hydrocarbon contains 12 carbon atoms.

6. The method of synthesizing aliphatic mercaptans from hydrogen sulfide and olefines which comprises chemically reacting a mixture of hydrogen sulfide and olefines at a temperature between approximately —35° C. and 150° C. in contact with catalyst consisting only of anhydrous aluminum chloride and anhydrous hydrogen chloride the molal ratio of olefines to hydrogen sulfide being within the limits of 2:1 to 1:2.

7. The method in accordance with claim 6 in which the olefine is ethylene.

8. Method in accordance with claim 6 in which the aluminum chloride is suspended in or dissolved in a non-aqueous organic liquid diluent which is inert to the extent of taking no substantial part in the reaction.

9. Method in accordance with claim 6 in which the aluminum chloride is present in the reaction mixture in an amount not less than about 0.01 mole per mole of olefine.

10. Method in accordance with claim 6 in which the hydrogen chloride is present in an amount not less than 0.01 mole per mole of aluminum chloride.

11. Method in accordance with claim 6 in which the aluminum chloride is present in the reaction mixture in an amount not less than about 0.01 mole per mole of olefine and the hydrogen chloride is present in the reaction mixture in an amount not less than 0.01 mole per mole of aluminum chloride.

12. Method in accordance with claim 6 in which the aluminum chloride is present in the reaction mixture in an amount between 0.05 and 1.5 moles per mole of olefine and the hydrogen chloride is present in an amount between 0.01 and 1.0 mole per mole of aluminum chloride.

13. Method in accordance with claim 6 in which the mole ratio of olefine to hydrogen sulfide is from 2 of the former to 1 of the latter to 1 of the former to 2 of the latter, the aluminum chloride is present in the mixture in amounts of 0.05 to 1.5 moles per mole of olefine and the hydrogen chloride is present in the mixture in amounts of 0.01 to 1.0 mole per mole of aluminum chloride.

14. The method of synthesizing aliphatic mercaptans from hydrogen sulfide and unsaturated acyclic hydrocarbons containing at least 8 carbon atoms in the molecule, comprising contacting a mixture of hydrogen sulfide and unsaturated acyclic hydrocarbons with anhydrous aluminum chloride in the presence of anhydrous hydrogen chloride at temperatures of approximately 20–30° C.

15. Method in accordance with claim 14 in which the aluminum chloride and hydrogen chloride constitute the sole catalysts.

16. Process in accordance with claim 15 in which the reaction is conducted under pressure of approximately 100–200 pounds per square inch.

17. Process in accordance with claim 14 in which the unsaturated acyclic hydrocarbons are predominantly $C_{12}$ hydrocarbons.

18. The method of synthesizing $C_{12}$ mercaptans comprising contacting a mixture of acyclic unsaturated hydrocarbons, composed chiefly of $C_{12}$ hydrocarbons, and hydrogen sulfide at a temperature of approximately 20–30° C. and under superatmospheric pressure in the presence of anhydrous aluminum chloride and hydrogen chloride as the sole catalysts.

19. Method in accordance with claim 18 in which the aluminum chloride is present in an amount between .05 and 1.5 moles per mole of olefin.

20. The method of synthesizing ethyl mercaptan comprising reacting ethylene and hydrogen sulfide at atmospheric temperature and under superatmospheric pressure in the presence of anhydrous aluminum chloride and hydrogen chloride as the sole catalysts for a period of time not in excess of approximately 24 hours.

21. Method in accordance with claim 20 in which the mole ratio of ethylene to aluminum chloride is not less than 1 to 1 and the mole ratio of hydrogen sulfide to ethylene is not less than 1 to 1.

RICHMOND T. BELL.
CARLISLE M. THACKER.

(References on following page)

REFERENCES CITED

The following references are of record in the file of this patent:

UNITED STATES PATENTS

| Number | Name | Date |
|---|---|---|
| 1,836,183 | Nisson | Dec. 15, 1931 |
| 2,052,268 | Williams | Aug. 25, 1936 |
| 2,101,096 | Reuter | Dec. 7, 1937 |
| 2,137,584 | Ott | Nov. 22, 1938 |
| 2,296,399 | Otto | Sept. 22, 1942 |
| 2,352,435 | Hoeffelman | June 27, 1944 |
| 2,366,453 | Meadow | Jan. 2, 1945 |

OTHER REFERENCES

Thomas, "Anhydrous Aluminum Chloride" in Organic Chemistry, Reinhold, New York, 1941, pages 867, 868.